(No Model.)

A. G. HAMM & H. W. EISENBISE.
CAR BRAKE.

No. 272,241. Patented Feb. 13, 1883.

WITNESSES:
Dorr Twitchell.
C. Sedgwick

INVENTOR:
A. G. Hamm
H. W. Eisenbise
BY Munn & Co
ATTORNEYS.

UNITED STATES PATENT OFFICE.

ADOLPH G. HAMM AND HARRY W. EISENBISE, OF BURLINGTON, IOWA.

CAR-BRAKE.

SPECIFICATION forming part of Letters Patent No. 272,241, dated February 13, 1883.

Application filed October 16, 1882. (No model.)

*To all whom it may concern:*

Be it known that we, ADOLPH G. HAMM and HARRY W. EISENBISE, both of Burlington, in the county of Des Moines and State of Iowa, have invented a new and useful Improvement in Car-Brakes, of which the following is a full, clear, and exact description.

This invention relates to brakes which are operated by the momentum of the car as obtained from friction derived from one of the axles of the car or its truck; and it consists in certain combinations of mechanical parts or devices, substantially as hereinafter described, and whereby increased facility is afforded for putting on, releasing, and controlling or holding the brake.

Reference is to be had to the accompanying drawings, forming part of this specification, in which similar letters of reference indicate corresponding parts in both the figures.

Figure 1:
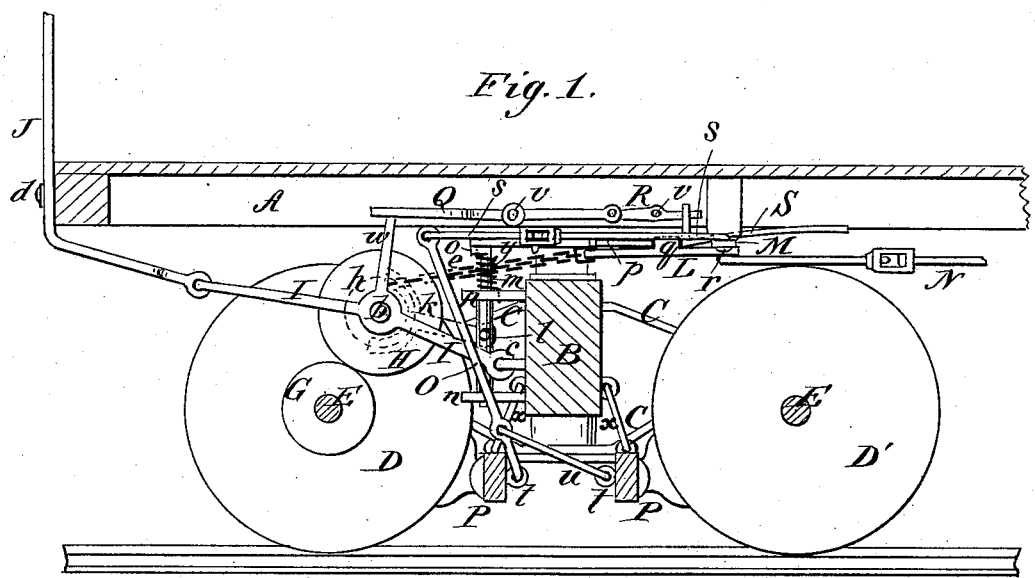
Figure 2:
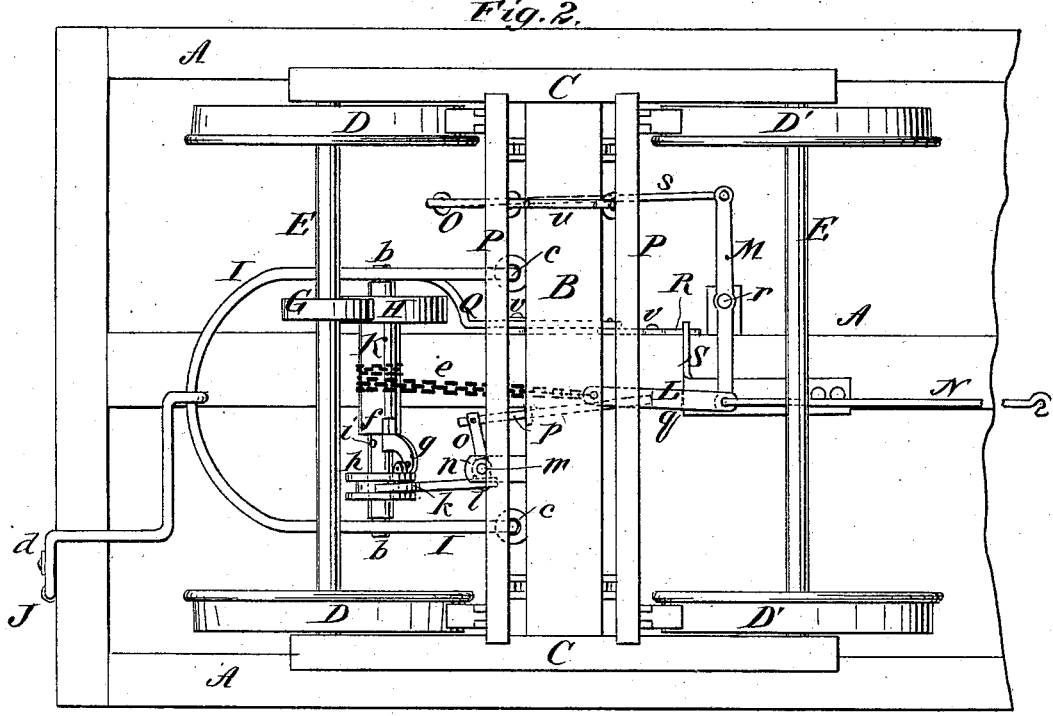

Figure 1 represents a vertical longitudinal section of a railroad-car truck, in part, with our improved brake applied; and Fig. 2, an inverted plan of the same.

A is the frame of a car, and B the supporting cross-beam, attached to the iron frames C C of the truck. D D' are the wheels of the truck, and E E their axles.

Secured upon the one axle E is a friction driving-wheel, G, which serves to rotate, when in contact, another friction-wheel, H, which may be of larger diameter than the wheel G. The wheel H is fast upon a shaft, b, which has its bearings in a frame, I, pivoted or loosely connected at c c to the beam in such manner as to permit of the wheel H being raised or lowered, to put it in or out of contact with the wheel G, by means of a lever, J, pivoted to the car at d, and extending upward to the top of the car, or otherwise.

Upon the shaft b is a loose sleeve, K, to which is fastened the brake-chain e. Said sleeve has a notch, f, cut in one end of it for a jaw, g, jointed to the side of a grooved sliding wheel, h, on the shaft b, to engage with or disengage from, accordingly as said clutch-wheel h is slid in opposite directions on the shaft b, the jaw g being pivoted at i to said shaft, and having a swinging motion when being put into or out of gear with the sleeve K.

The grooved wheel h is slid in either direction upon the shaft b by means of a fork-lever, k, jointed at l to an upright spindle, m, which works in bearings n n, fast to the beam B. This spindle m has on it a second lever, o, to which is attached a horizontal sliding rod, p, that bears against a projection, q, upon a rod, L, to which the outer end of the chain e is attached, and which is connected at its back end with a lever, M, pivoted at r to the truck, and with an extension-rod, N, by which the brake action may be extended to an adjacent truck or another set of wheels to apply the brake to eight wheels at a time.

To the opposite end of the lever M to which the rod L is attached is secured a rod, s, that is connected with the upper end of a rod, O, which is attached below by eyebolts t t and a branch rod, u, to the brake-beams P P, that bear by shoes on the wheels D D', and are suspended by links x x from the cross-beam B. The rods or bolts connected with the brake-beams may be adjustable by right and left handed screws, so as to regulate their action on the wheels, to admit of the latter slipping or not, as desired.

Q and R are compound levers having their fulcrums v v on the car-frame. The lever Q rests at its forward end upon an arm, w, projecting upward from the brake-frame I, and the lever R serves to control a spring, S, fast to the car-frame, and which engages with the rod L back of its projection q.

In the normal arrangement of the parts the sliding grooved wheel h occupies such a position upon the shaft b as to cause the jaw g to engage with the sleeve K by its notch f.

To apply the brake, the lever J is manipulated to work the swinging frame I, so that its friction-wheel H will be brought down into contact with the friction-wheel G on the car-axle. This will cause the sleeve K to wind up the brake-chain e, and, by the connection L, M, and s, to actuate the rods O u, so that the brake-beams P or their shoes will throw the necessary friction or pressure on the car-wheels D D'. In this action the rod L is moved sufficiently to allow the spring or spring-catch S to engage with it back of its projection q, which keeps the brake from being released or flying back, and at the same time the rod L, by the forward end of its projection q, moves the rod p, which, by the lever o, spindle m, and lever k, shifts the grooved wheel h, to disengage the jaw g from the notch f of the sleeve K. This causes said sleeve to cease winding on the chain, although the friction-wheel G continues to drive the friction-wheel H.

To release the brake, the lever J is kicked or manipulated so as to raise the frame I, which not only relieves the friction-wheel H from contact with the driving friction-wheel G, and prevents unnecessary wear of said wheels, but, by means of the arm w, actuates the lever Q, which in its turn acts upon the lever R, to raise the spring-catch S above the projection q on the rod L, that is then free to move back, and provides for the brake-beams P P freeing themselves. A spring, y, may be applied to the spindle m or other part, to throw back the rod p when the lever I is liberated, as described, to engage the jaw g again with the sleeve K, ready for a repetition of the brake action on the car-wheels when necessary; or the rod p may be in permanent slotted or other connection with the rod L for the same purpose.

A brake mechanism constructed as described provides for the automatic action of the brake by friction derived from the motion of the car in a very simple and perfect manner, one man being able to do many times the amount of work that he could do with an ordinary brake. The tightening up of the brake, too, is always secured. There is no excessive wear and tear. The brake can be regulated so that it will provide for the car-wheels sliding or not, and it is capable of being quickly applied and released. Also, the action of the brake, as derived from a single driver, may be extended to control eight wheels instead of four, as shown.

Various changes may be made in the arrangement of the mechanism or certain of its details, without changing the invention, to adapt it to trucks or cars of different descriptions and to apply the brake-shoes to the wheels on the outside of the latter instead of between them—that is, on the opposite sides of their axes.

Having thus described our invention, what we claim as new, and desire to secure by Letters Patent, is—

1. In a car-brake, the combination of the spring or spring-catch S, the swinging frame or lever I, having a loose sleeve, K, connected to the chain of the brake-applying mechanism, and the holding device L q, adapted to engage with spring or catch S, said sleeve having a frictional wheel or disk to receive motion from the car-axle, substantially as and for the purpose set forth.

2. In a car-brake, the combination of the rod p, connected by lever o to the spindle m, having the lever k, the swinging frame or lever I, provided with the clutch-disk h, to which is connected the jaw g, pivoted in the shaft b of said swinging lever, the loose shaft-sleeve K, having a notch, f, and frictional wheel or disk H, adapted to receive motion from the car-axle, and brake-applying mechanism having the rod L connected to the said sleeve, and having a projection, q, which is adapted to engage with the rod p, substantially as and for the purpose set forth.

3. The combination, with the swinging frame I, the friction-wheel H, and its shaft b, of the sliding grooved or clutch wheel h, the loose sleeve K, provided with an end notch, f, and the engaging and disengaging jaw g, pivoted or jointed to said wheel h and shaft b, essentially as shown and described.

4. The swinging frame I, provided with an upwardly-projecting arm, w, in combination with the compound levers Q R, the spring-catch S, the sliding rod L, provided with a projection, q, the chain e, the loosely-fitted winding-sleeve K, the friction-wheel H and its shaft b, the rod p, the spindle m, with its levers o k, and clutch devices for engaging and disengaging the sleeve K, with the shaft b, substantially as specified.

5. The combination of the lever M, the rods s O u, the suspended brake-beams P P, the sliding rod L, with which the brake-chain is connected, and the spring-catch S, essentially as shown and described.

6. The combination of the lever J, the swinging frame I, the axle friction-wheel G, the friction-wheel H, carried by said frame, the chain-winding sleeve K, the shaft b, and the engaging and disengaging devices h g, the arm w on the swinging frame I, the compound levers Q R, the spring-catch S, the rod L and chain e, the rod p and levers o k, the lever M, the rods s O u, and the suspended brake-beams P P, substantially as specified.

ADOLPH GUSTAVE HAMM.
HARRY W. EISENBISE.

Witnesses:
OTTO E. WEBEN,
H. HOLSTEIN.